(12) United States Patent
Riedel, Jr. et al.

(10) Patent No.: US 11,536,407 B2
(45) Date of Patent: Dec. 27, 2022

(54) SYSTEMS AND METHOD FOR PROVIDING A MODULAR HYDRAULIC FRACTURING MANIFOLD

(71) Applicant: Caterpillar Inc., Peoria, IL (US)

(72) Inventors: Robert E. Riedel, Jr., Fox River Grove, IL (US); Solomon Austin Cong, Houston, TX (US); Peter Allan Manos, McHenry, IL (US); Christian Joseph Murray, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 16/992,790

(22) Filed: Aug. 13, 2020

(65) Prior Publication Data
US 2022/0049807 A1  Feb. 17, 2022

(51) Int. Cl.
| F16L 41/03 | (2006.01) |
| F16L 3/02 | (2006.01) |
| E21B 43/267 | (2006.01) |
| E21B 43/26 | (2006.01) |

(52) U.S. Cl.
CPC .............. *F16L 41/03* (2013.01); *F16L 3/02* (2013.01); *E21B 43/267* (2013.01); *E21B 43/2607* (2020.05)

(58) Field of Classification Search
CPC ............................ E21B 43/2607; F16L 41/03
See application file for complete search history.

(56) References Cited

U.S. PATENT DOCUMENTS

| 8,627,891 | B2 | 1/2014 | Omvik |
| 9,239,125 | B2 | 1/2016 | Ungchusri et al. |
| 9,995,102 | B2 | 6/2018 | Dille et al. |
| 10,487,637 | B2 | 11/2019 | Guidry et al. |
| 10,526,862 | B2* | 1/2020 | Witkowski .............. F04B 23/06 |
| 10,662,749 | B1 | 5/2020 | Hill et al. |
| 10,982,523 | B1* | 4/2021 | Hill ........ F16L 41/021 |
| 2012/0181013 | A1* | 7/2012 | Kajaria ............ E21B 43/26 |
| | | | 166/79.1 |
| 2014/0096974 | A1* | 4/2014 | Coli ............ E21B 43/2607 |
| | | | 166/308.1 |
| 2015/0000766 | A1* | 1/2015 | Arizpe ............ F16L 55/035 |
| | | | 137/561 A |
| 2018/0223640 | A1 | 8/2018 | Keihany et al. |
| 2018/0283102 | A1 | 10/2018 | Cook |
| 2018/0284817 | A1 | 10/2018 | Cook et al. |

\* cited by examiner

*Primary Examiner* — Reinaldo Sanchez-Medina
*Assistant Examiner* — Nicole Gardner

(57) ABSTRACT

A fracturing manifold system including a first plurality of junctions mounted on a support structure and fluidly connected via conduit, individual ones of the first plurality of junctions configured to receive fracturing fluid from at least one fracturing pump and the first plurality of junctions including a first terminal junction. The fracturing manifold system further includes a fracturing head fluidly connected to the first plurality of junctions. The fracturing manifold system is configurable between a first configuration in which the fracturing head is mounted at a location proximate an end of the support structure and a second configuration in which an additional junction is mounted on the first support structure at the location, the additional junction is fluidly connected to the first plurality of junctions, a second plurality of junctions is fluidly connected to the additional junction, and the fracturing head is fluidly connected to the second plurality of junctions.

20 Claims, 7 Drawing Sheets

SYSTEMS AND METHOD FOR PROVIDING A MODULAR HYDRAULIC FRACTURING MANIFOLD

TECHNICAL FIELD

The present disclosure relates to a hydraulic fracturing manifold. More specifically, the present disclosure relates to a modular hydraulic fracturing manifold that is configurable between multiple configurations.

BACKGROUND

Hydraulic fracturing is a well stimulation technique that typically involves pumping hydraulic fracturing fluid into a wellbore at a rate and pressure sufficient to form factures in a rock formation surrounding the wellbore. This well stimulation technique often enhances the natural fracturing of a rock formation in order to increase the permeability of the rock formation, thereby improving recovery of water, oil, natural gas, and/or other fluids. In order to fracture such rock formations, the hydraulic fracturing fluid is injected into the wellbore at pressures and rates sufficient to exceed a fracture gradient of the target formation. In some conventional arrangements, a series of pumps is used to pressurize the hydraulic fracturing fluid. A fracturing manifold receives the pressurized hydraulic fracturing fluid from the pumps and delivers the hydraulic fracturing fluid to an injection point (e.g., a frac tree) at the necessary pump rate.

In order to reduce setup and teardown times, fracturing manifolds are often transported between jobsites on trailers. However, trailers are limited by structural size and weight restrictions and by local government restrictions. Furthermore, current fracturing manifold trailers lack modularity in the number of junctions provided and the location of a fracturing head in a fracturing manifold system.

An example hydraulic fracturing manifold is described in U.S. Pat. No. 10,662,749 (hereinafter referred to as the '749 reference). In particular, the '749 reference describes a trailer mounted hydraulic fracturing manifold. The trailer mounted fracturing manifold includes a specific number of cross junctions that are mounted on the trailer and receive fracturing fluid from fracturing pumps. The '749 reference further describes a modular manifold (or secondary manifold) that may be coupled to the trailer mounted fracturing manifold in order to provide additional cross junctions. The '749 reference does not, however, describe a trailer mounted fracturing manifold that includes a fracturing head that is moveable between various configurations in a modular fracturing manifold system. For instance, the '749 reference describes that a fracturing head can be attached to an end of the trailer mounted fracturing manifold but is not included on the trailer. As a result, the system described in the '749 reference is not configured to, among other things, provide a trailer-mounted hydraulic fracturing manifold that includes a fracturing head that is configurable between multiple positions in multiple configurations.

Example embodiments of the present disclosure are directed toward overcoming the deficiencies described above.

SUMMARY

An example modular fracturing manifold includes a trailer chassis and a first plurality of junctions mounted on the trailer chassis and fluidly connected via conduit, individual junctions of the first plurality of junctions configured to receive fracturing fluid from a fracturing pump via a high-pressure flow line and the first plurality of junctions terminating at a first terminal junction. The modular fracturing manifold further includes a fracturing head fluidly connected to the first plurality of junctions. The modular fracturing manifold is configurable between a first configuration in which the fracturing head is mounted at a location proximate an end of the trailer chassis and the fracturing head is coupled to the first terminal junction and a second configuration in which an additional junction is mounted on the trailer chassis at the location, the additional junction is coupled to the first terminal junction, a second plurality of junctions is fluidly connected to the additional junction, and the fracturing head is coupled to a second terminal junction of the second plurality of junctions.

An example method for configuring a modular fracturing manifold between a first configuration and a second configuration includes decoupling the fracturing head from a first terminal junction of the first plurality of junctions, and removing, from the trailer chassis, the fracturing head from a location that is proximate and end of the trailer chassis. The method further includes coupling an additional junction to the first terminal junction at the location such that the additional junction is fluidly connected to the first plurality of junctions, aligning the first plurality of junctions with a second plurality of junctions disposed on a transportation skid, coupling the second plurality of junctions disposed on the transportation skid to the additional junction such that the first plurality of junctions, the additional junction, and the second plurality of junctions are fluidly connected, and coupling the fracturing head to a second terminal junction of the second plurality of junction on the transportation skid such that the fracturing head is fluidly connected to the second plurality of junctions.

In a further example, a fracturing manifold system includes a first plurality of junctions mounted on a support structure and fluidly connected via conduit, individual ones of the first plurality of junctions configured to receive fracturing fluid from at least one fracturing pump and the first plurality of junctions including a first terminal junction and a fracturing head fluidly connected to the first plurality of junctions. The fracturing manifold system is configurable between at least a first configuration in which the fracturing head is mounted at a location proximate an end of the support structure and the conduit provides direct fluid communication between the fracturing head and the first terminal junction and a second configuration in which an additional junction is mounted on the support structure at the location, the additional junction is fluidly connected to the first terminal junction, a second plurality of junctions is fluidly connected to the additional junction, and the fracturing head is fluidly connected to one of the second plurality of junctions.

DETAILED DESCRIPTION

Figure 1:
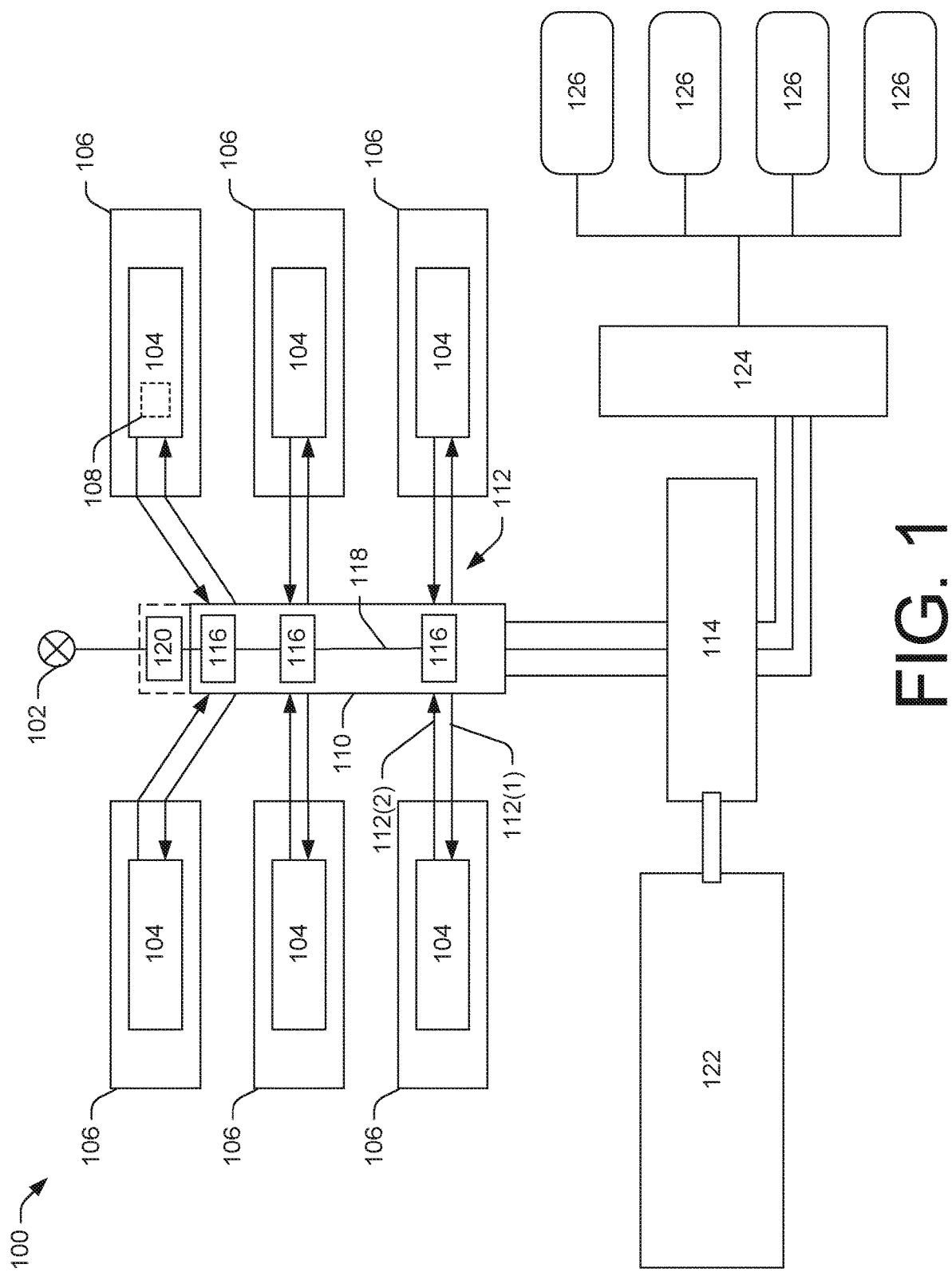
FIG. 1 is a hydraulic fracturing system in accordance with an example of the present disclosure.

Wherever possible, the same reference numbers will be used throughout the drawings to refer to the same or like parts. FIG. 1 depicts an example hydraulic fracturing system 100. For example, FIG. 1 depicts a plan view of an example hydraulic fracturing site along with equipment that is used during a hydraulic fracturing process. While FIG. 1 depicts example equipment that is used during hydraulic fracturing, it is to be understood that additional equipment may be implemented to conduct the hydraulic fracturing process. 'Furthermore, certain equipment shown in FIG. 1 may be omitted in some hydraulic fracturing systems.

As mentioned previously, hydraulic fracturing is a well-stimulation technique that requires high-pressure injection of fracturing fluid into a well 102 and corresponding wellbore in order to hydraulically fracture a rock formation surrounding the wellbore. While the description provided herein describes hydraulic fracturing in the context of wellbore stimulation for oil and gas production, it is to be understood that other uses of hydraulic fracturing are contemplated herein. For example, the hydraulic fracturing system 100 described herein may be used to stimulate groundwater wells, to dispose of waste by injection, to measure stress in the ground, to precondition and/or induce cave-ins for mining, to improve electrical generation in geothermal systems, or the like.

High-pressure injection of the fracturing fluid is typically achieved by a series of pump systems 104 that are often mounted (or housed) on a series of trailers 106. The specific configuration of the pump systems 104 may vary. It is to be understood that each of the trailers 106 may include a similar pump system in the same or different configuration, relative to other trailers/pump systems. In some examples, each of the pump systems 104 includes at least one hydraulic fracturing pump 108 (referred to herein collectively, as "the pumps 108" and individually as "the pump 108"). The pumps 108 may include various types of high-volume hydraulic fracturing pumps such as triplex or quintuplex pumps. Additionally, and/or alternatively, the pumps 108 may include other types of reciprocating positive-displacement pumps or gear pumps. The pumps 108 required and corresponding designs thereof may vary depending on the fracture gradient of the rock formation that will be hydraulically fractured, the number of pumps 108 used in a hydraulic fracturing system 100, the flow rate necessary to complete the hydraulic fracture, the pressure necessary to complete the hydraulic fracture, etc. The hydraulic fracturing system 100 may include any number of trailers 106 having pumps 108 thereon in order to pump hydraulic fracturing fluid at a predetermined rate and pressure. The exact configuration of each trailer 106 may vary from trailer to trailer and/or may vary from site to site.

In some examples, the pumps 108 may be in fluid communication with a manifold 110 via various flow lines 112 such as pipes or other types of conduit. The manifold 110 combines fracturing fluid received from the pumps 108 prior to injecting the fracturing fluid into the well 102. The manifold 110 also distributes fracturing fluid to the pumps 108 that the manifold 110 receives from a blender 114. In some examples, the various fluids are transferred between the various components of the hydraulic fracturing system via the flow lines 112. The flow lines 112 include low-pressure flow lines 112(1) and high-pressure flow lines 112(2). In some examples, the low-pressure flow lines 112(1) deliver fracturing fluid from the manifold 110 to the pumps 108, and the high-pressure flow lines 112(2) transfer high-pressure fracturing fluid from the pumps 108 to the manifold 110. The manifold 110 includes a plurality of junctions 116 that receive the fracturing fluid from the pumps 108. In some examples, the junctions 116 include a port on either side of the junction 116 and may combine fracturing fluid that is received from the fracturing pumps 108. The junctions 116 are fluidly connected via conduit 118 such as pipes or other type of high-pressure conduit. While the conduit 118 includes separate and individual portions of conduit fluidly connecting various components of the manifold, the conduit 118 is referred to herein collectively as "the conduit 118". The manifold 110 also includes a fracturing head 120, which is often referred to as a "goat head." The fracturing head 120 may be included on a same support structure as the manifold 110. The fracturing head 120 receives fracturing fluid from the junctions 116 of the manifold 110 via the conduit 118 and delivers the fracturing fluid to the well 102 (via a wellhead mounted on the well 102) during a hydraulic fracturing process. In some examples, the fracturing head 120 may be fluidly connected to multiple wells. During a hydraulic fracturing process, the wells may include frac trees that are installed on individual wells, e.g., the well 102 and additional wells.

The blender 114 combines proppant received from a proppant storage unit 122 with fluid received from a hydration unit 124. In some examples, the proppant storage unit 122 may include a dump truck, a truck with a trailer, a silo or series of silos, or other type of containers. The hydration unit 124 may receive water from one or more water tanks 126. In some examples the hydraulic fracturing system 100 may receive water from water pits, water trucks, water lines, and/or any other suitable water source of water. The hydration unit 124 adds fluid additives to the water such as polymers or other chemical additives. Such additives may increase the viscosity of the fracturing fluid prior to mixing the fluid with proppant in the blender 114. The hydration unit 124 also mixes additives into the fracturing fluid such that the fracturing fluid includes an appropriate pH for injection into a targeted formation surrounding the wellbore. The fluid additives may be stored in the hydration unit 124. Additionally, and/or alternatively, the hydration unit 124 may be in fluid communication with one or more fluid additive storage units (not shown) that store fluid additives that are added to the fracturing fluid via the hydration unit 124. The hydration unit 124 may include a series of tanks, pumps, gates, etc.

Depending on the application, more or fewer of the pump systems 104 may be required. Moreover, as more of the pump systems 104 are required, additional of the junctions 116 are also required. Accordingly, aspects of this disclosure describe implementations in which the manifold 110 is modular, e.g., being configurable between multiple configurations. For example, in a first configuration, the fracturing head 120 is mounted at a location proximate an end of a primary support structure of the manifold 110. In this first configuration, the fracturing head 120 is coupled to and fluidly connected to a terminal junction of the junctions 116 in the first configuration. In a second configuration, an additional junction 116 is mounted in place of the fracturing head 120 at the location proximate the end of the primary support structure of the manifold 110. In such a configuration, the additional junction is coupled to a one or more additional junctions. In some examples, the one or more additional junctions may be mounted on a secondary support structure. The secondary support structure may include a transportation skid, an additional trailer chassis, or other type of support structure. Such configurations will be shown and described further beginning with FIG. 2.

Figure 2:
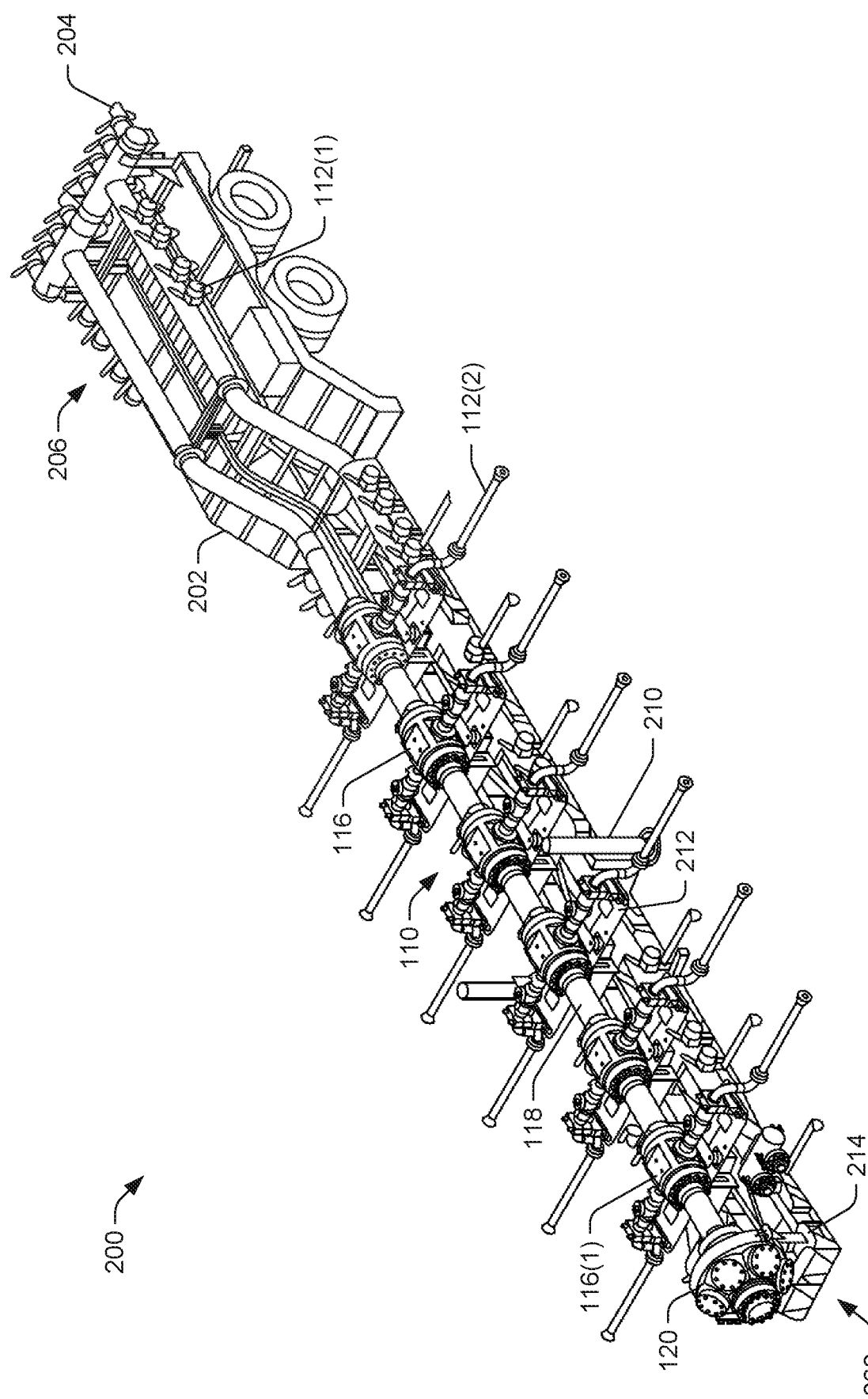
FIG. 2 is an example hydraulic fracturing manifold shown in a first configuration in accordance with an example of the present disclosure.

FIG. 2 depicts a hydraulic fracturing manifold, which is the manifold 110 shown in FIG. 1 in this example, arranged in a first configuration 200. In the first configuration 200, the manifold 110 includes a number of components, e.g., the junctions 116 and the conduit 118, mounted on a trailer chassis 202. The trailer chassis 202 is an example of a transportable support structure although in other examples, the manifold 110 (and its components) may be mounted on other types of transportable or stationary support structures. As mentioned previously, the manifold 110 receives fracturing fluid from the blender 114 (not shown in FIG. 2). In some examples, the fracturing fluid that the manifold 110 receives from the blender 114 may be low-pressure fracturing fluid. The manifold 110 may receive such fracturing fluid via one or more inlets 204 that are fluidly connected to the blender 114. The inlets 204 may be positioned proximate a first end 206 of the trailer chassis 202. Fracturing fluid received via the inlets 204 is transported to fracturing pumps 108 (not shown) via the low-pressure flow lines 112(1). Once the fracturing pumps 108 pressurize the fracturing fluid to a predetermined pressure, pressurized fracturing fluid is transferred from the fracturing pumps 108 to the junctions 116 via high-pressure flow lines 112(2).

The fracturing fluid received from the fracturing pumps 108 is combined in the junctions 116 and flows through the conduit 118 towards the fracturing head 120. As mentioned previously, the fracturing head 120 may be fluidly connected to one or more wellheads. In the first configuration 200 shown in FIG. 2, the fracturing head 120 may be mounted at a location proximate a second end 208 of the trailer chassis 202. Furthermore, the fracturing head 120 is coupled to and fluidly connected to a terminal junction 116(1) of the junctions 116 via the conduit 118. In the first configuration 200 illustrated, the manifold 110 includes six junctions 116 and may, therefore, receive fracturing fluid from twelve fracturing pumps 108 (not shown). However, the manifold 110 may include fewer than or more than six junctions 116. For example, the manifold 110 may include between four and ten junctions 116 in the first configuration 200. In some examples, the number of junctions 116 included in the first configuration 200 may be determined based on local transportation restrictions for a trailer chassis that is hauled on various roadways. For example, the manifold 110 may include a number of junctions 116 and a fracturing head 120 such that the total weight of the manifold 110 and trailer chassis 202 conforms with transportation restrictions.

In some examples, the junctions 116 are mounted on the trailer chassis 202 via first mounting structures 212. The first mounting structures 212 are coupled to and supported by one or more wing plates (shown and described further herein below) located on the trailer chassis 202. The first mounting structures 212 are shaped to support the junctions 116 on the trailer chassis 202. In some examples, the first mounting structures 212 are T-shaped plates including a top portion that supports one of the junctions 116 and a bottom portion that is coupled to the trailer chassis 202 (or other support structure). An example of the first mounting structures 212 is shown in and described below in connection with FIG. 5.

Furthermore, the fracturing head 120 is mounted on the trailer chassis 202 via a second mounting structure 214. The second mounting structure 214 may be shaped to support the fracturing head 120. For example, the second mounting structure 214 is a U-shaped plate having an upper portion shaped to support the fracturing head 120 and a bottom portion coupled to the trailer chassis 202 (or other support structure). The second mounting structure 214 may be attached to and supported by the one or more wing plates located on the trailer chassis 202. In some examples, the second mounting structure 214 may be different than the first mounting structures 212. However, in some examples, the first mounting structures 212 may be substantially similar to the second mounting structure 214. Still further, in some examples, the junctions 116 and the fracturing head 120 may be mounted on the trailer chassis 202 via a same type of mounting structure. An example of the second mounting structure 214 is shown in and described below in connection with FIG. 6. The trailer chassis 202 may further include leveling jacks 210. The leveling jacks 210 are adjustable to ensure that the trailer chassis 202 and manifold 110 mounted thereon are adjusted to a desired inclination.

Figure 3:
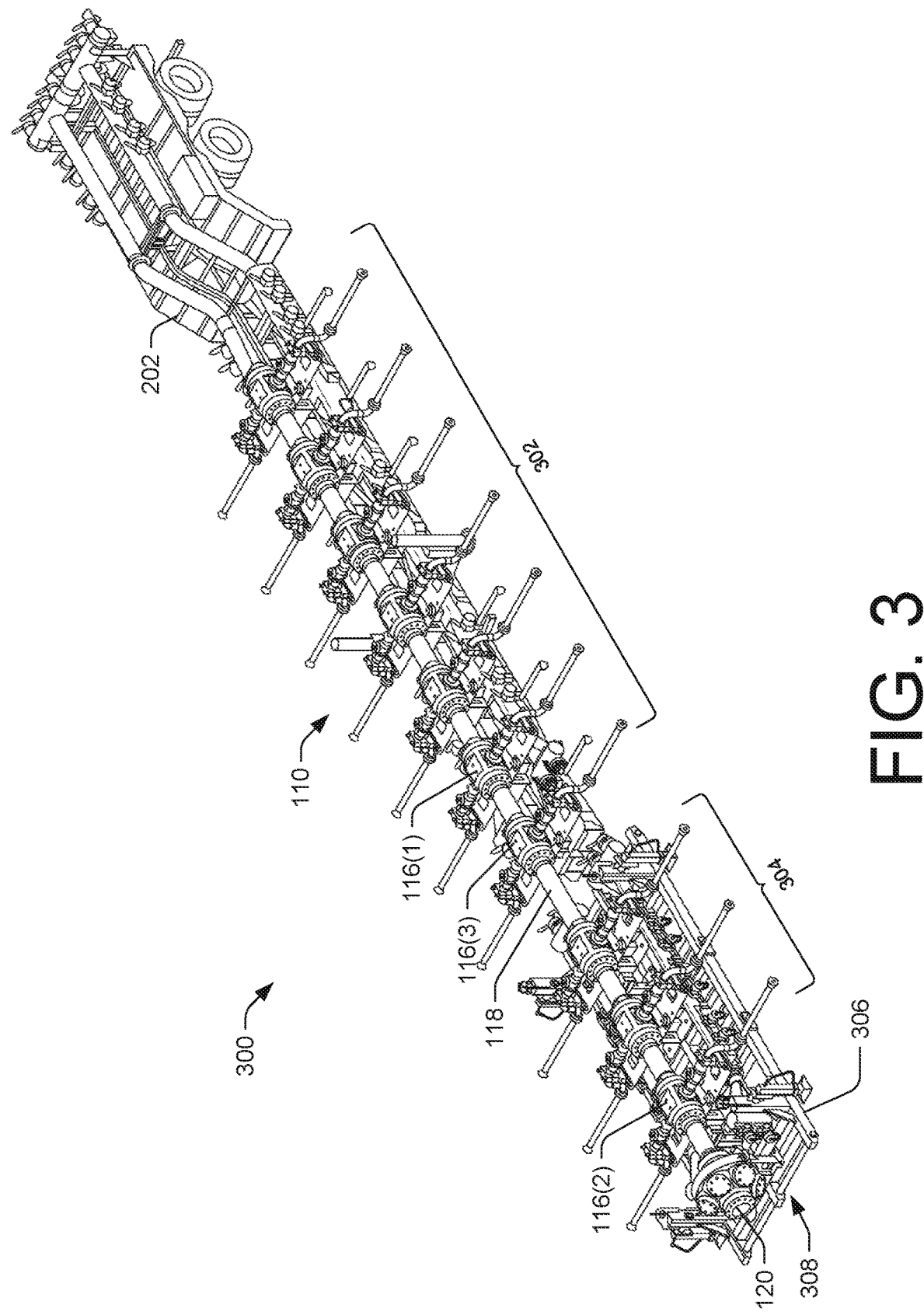
FIG. 3 is an example hydraulic fracturing manifold shown in a second configuration in accordance with an example of the present disclosure.

FIG. 3 depicts the manifold 110 arranged in a second configuration 300. In the second configuration 300, the manifold 110 includes a first plurality 302 of junctions 116 mounted on the trailer chassis 202 and a second plurality 304 of junctions 116 mounted on a secondary support structure such as a transport skid 306. Alternatively, the secondary support structure may include any type of transportable support structure including another trailer chassis. In the second configuration 300, the first plurality 302 of junctions 116 are fluidly connected to the second plurality 304 of junctions 116 via conduit 118. In some examples, the conduit 118 that connects the first plurality 302 of junctions 116 to the second plurality 304 of junctions 116 is sized to bridge a space between the trailer chassis 202 and the transportation skid 306. Thus, in some examples, the conduit 118 that connects the first plurality 302 of junctions 116 to the second plurality 304 of junctions 116 may be referred to as "bridging conduit."

In the illustrated example, the fracturing head 120 is mounted on the transportation skid 306 when the manifold 110 is in the second configuration 300. For example, referring back to FIG. 2, when the manifold 110 is in the first configuration 200, the fracturing head 120 is mounted at a location proximate an end 208 of the trailer chassis 202 and is fluidly connected to the first terminal junction 116(1) of the first plurality 302 of junctions 116. When the manifold 110 is in the second configuration 300, the fracturing head 120 is removed from the location on the trailer chassis 202 and is attached to an end 308 of the transport skid 306 such that the fracturing head 120 is fluidly connected to a second terminal junction 116(2) of the second plurality 304 of junctions 116. Additionally, and/or alternatively, the transportation skid 306 may include a dedicated fracturing head 120. The use of a single fracturing head between various configurations significantly reduces cost of the manifold 110 and overall weight of the manifold 110. Furthermore, adding junctions 116 in the second configuration 300 may increase a potential flow rate of fracturing fluid through the manifold 110.

In some examples, an additional junction 116(3) is mounted on the trailer chassis 202 in the location that the fracturing head 120 previously occupied, and the additional junction 116(3) is coupled to the first terminal junction 116(1) such that the additional junction 116(3) is fluidly connected to the first terminal junction 116(1). As such, the second mounting structure 214 configured to support the fracturing head 120 may be removed from the location at the end 208 of the trailer chassis 202. The second mounting structure 214 (or an instance thereof) may be attached at a second location proximate the end 308 of the transportation skid 306. The fracturing head 120 may then be mounted on the second mounting structure 214 at the second location proximate the end 308 of the transportation skid 306. Once the second mounting structure 214 is removed from the end 208 of the trailer chassis 202, an instance of the first mounting structure 212 is coupled to the trailer chassis 202 in the location proximate the end 208 of the trailer chassis 202. Additionally, and/or alternatively, in an example where the first mounting structure 212 and the second mounting structure 214 are substantially similar and/or the same, the second mounting structure 214 remains in the location at the end 208 of the trailer chassis 202 and the additional junction 116(3) is mounted thereon. Furthermore, the additional junction 116(3) is fluidly connected to the second plurality 304 of the junctions 116 via the conduit 118. As shown in FIG. 3, the conduit 118 connecting the additional junction 116(3) to the second plurality 304 of junctions 116 is sized to span a distance between the trailer chassis 202 and the transportation skid 306.

In the second configuration 300, the manifold 110 includes flow lines (not shown) connecting the low-pressure flow lines on the trailer chassis 202 to the low-pressure flow lines on the transportation skid 306. While FIG. 3 depicts the transportation skid 306 as having three junctions 116 mounted thereon, the transportation skid 306 may include any number of junctions 116. For example, the transportation skid 306 (or other type of secondary support structure) may have between two and six junctions 116 mounted thereon.

Figure 4:
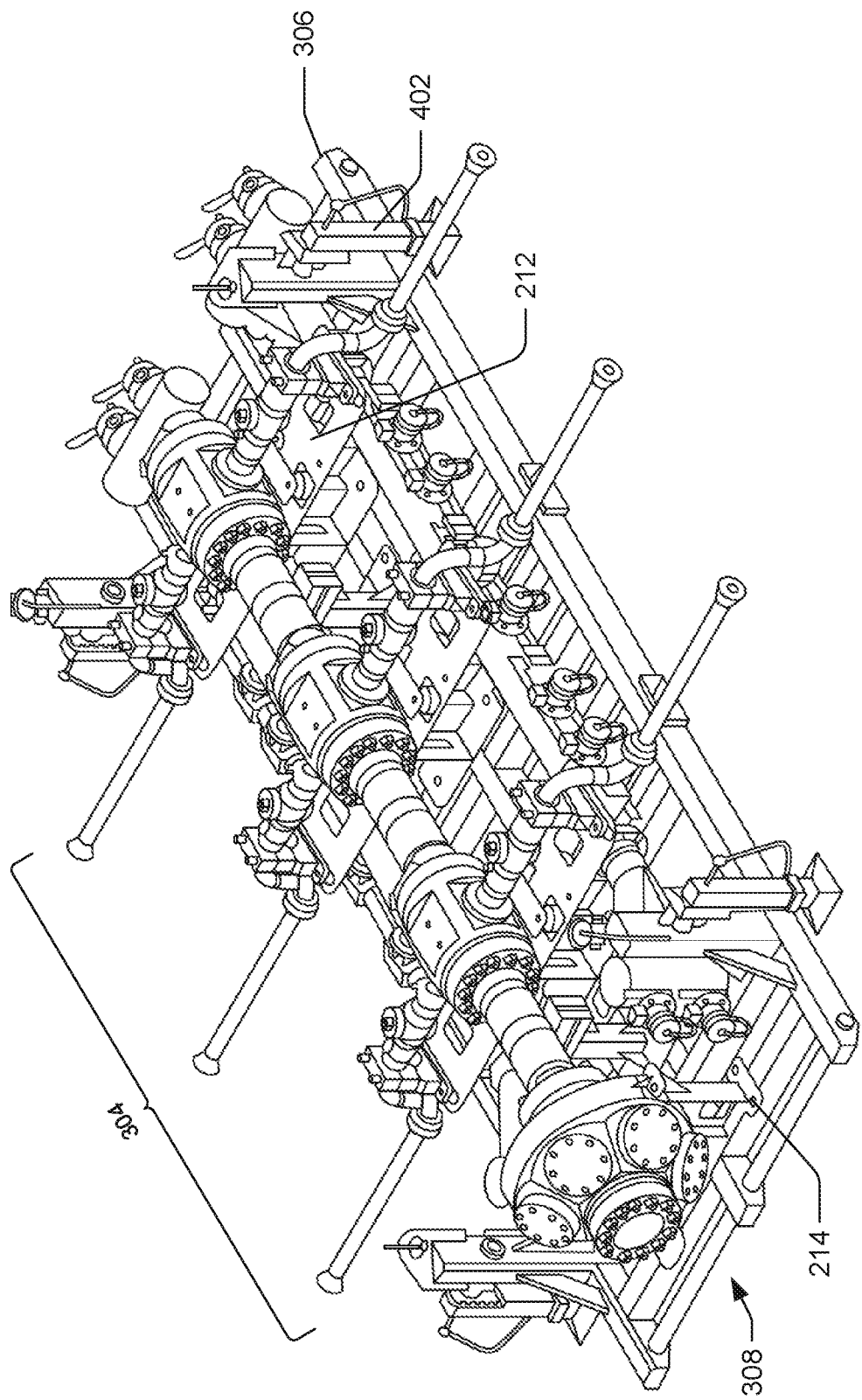
FIG. 4 is an example transportation skid providing additional junctions for a hydraulic fracturing manifold in accordance with an example of the present disclosure.

FIG. 4 depicts an example of the transportation skid 306 providing the second plurality 304 of junctions 116 for the hydraulic fracturing manifold 110. In some examples, the transportation skid 306 includes leveling jacks 402. The leveling jacks 402 are adjustable to ensure that the transportation skid 306 is adjusted to a desired inclination and/or is aligned with the trailer chassis 202. As shown in FIG. 4, instances of the first mounting structures 212 are coupled to and supported by the transportation skid 306. The junctions 116 are then mounted on the first mounting structures 212. The transportation skid 306 also includes at least one second mounting structure 214. As mentioned previously, the first mounting structure 212 and the second mounting structure 214 may be substantially similar and/or the same and the junctions 116 and the fracturing head 120 may be mounted on a same type of mounting structure. In some examples, the second mounting structure 214 shown in FIG. 4 may be removed from the trailer chassis 202 and coupled to the transportation skid 306 to support the fracturing head 120 thereon. Alternatively, the transportation skid 306 may include a dedicated second mounting structure 214 (or separate mounting structure) that is coupled to the transportation skid 306 proximate an end 308 of the transportation skid 306. In some examples, the transportation skid 306 does not include the fracturing head 120, but is instead configured to receive the fracturing head 120 that was previously mounted on the trailer chassis 202.

Figure 5:
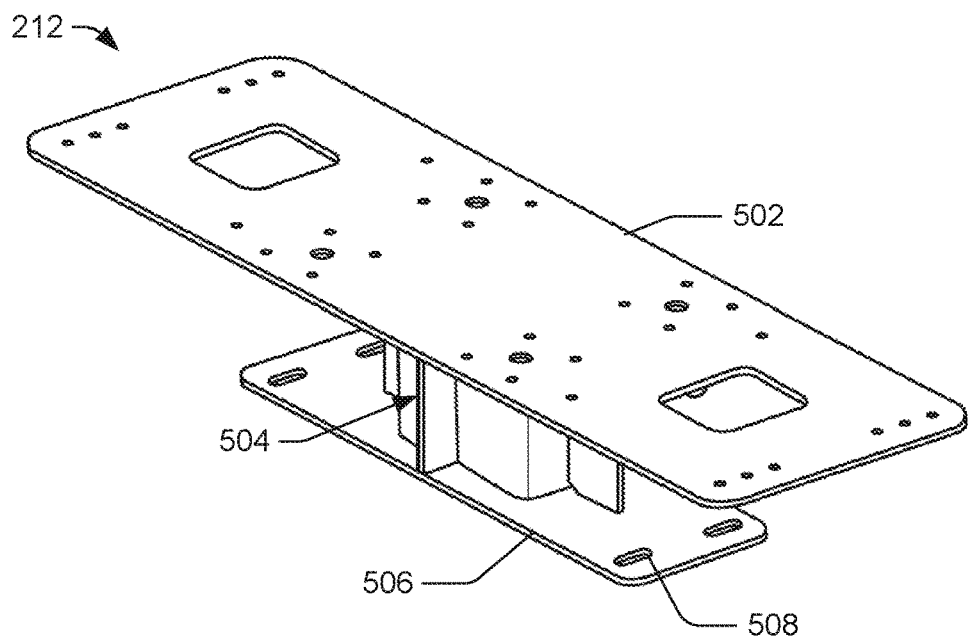
FIG. 5 is an example mounting structure that supports a fracturing manifold in accordance with an example of the present disclosure.

FIG. 5 depicts the first mounting structure 212. As seen in FIG. 5, the first mounting structure 212 may be generally T-shaped. However, in some examples, the first mounting structure 212 may include any shape in order to support one or more components of the manifold 110 thereon. The first mounting structure 212 includes a top portion 502 that is configured to support an individual junction 116. In some examples, the individual junction 116 may be coupled to the top portion 502 of the first mounting structure via one or more fasteners (e.g., nuts and bolts, screws, etc.). The first mounting structure 212 includes a middle portion 504 connecting the top portion 502 to a bottom portion 506. The bottom portion 506 may be configured to rest on and be coupled to the trailer chassis 202, the transportation skid 306, or other support structure. The first mounting structure 212 may be coupled to the trailer chassis 202, the transportation skid 306, or other type of support structure via one or more fasteners. For example, the bottom portion 506 of the first mounting structure 212 may include one or more apertures 508 arranged in a pattern such that the one or more apertures 508 correspond with apertures in the support structure on which the first mounting structure 212 is mounted. Thus, one or more fasteners may pass through the one or more apertures 508 in the first mounting structure 212 and apertures in the support structure and may attach the first mounting structure 212 to the support structure. Additionally, and/or alternatively, the first mounting structure 212 may be welded to the support structure.

Figure 6:
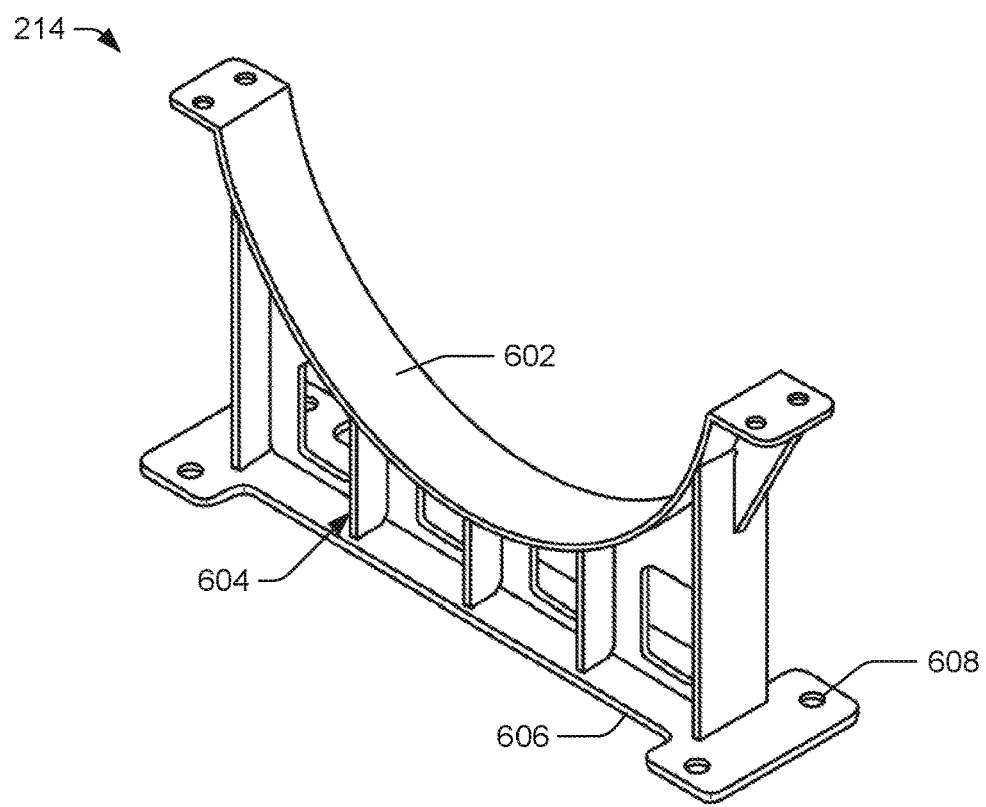
FIG. 6 is an example mounting structure that supports a junction in accordance with an example of the present disclosure.

FIG. 6 depicts the second mounting structure 214. As seen in FIG. 6, the second mounting structure 214 is generally U-shaped. However, in some examples, the second mounting structure 214 may include any shape in order to support one or more components of the manifold 110 thereon. The second mounting structure 214 includes a top portion 602 that is substantially U-shaped. The top portion 602 is shaped to support the fracturing head 120. The second mounting structure 214 includes a middle portion 604 connecting the top portion 602 to a bottom portion 606. The bottom portion 606 may be configured to rest on and be coupled to the trailer chassis 202, the transportation skid 306, or other support structure. The second mounting structure 214 may be coupled to the trailer chassis 202, the transportation skid 306, or other type of support structure via one or more fasteners. For example, the bottom portion 606 of the second mounting structure 214 may include one or more apertures 608 arranged in a pattern such that the one or more apertures 608 correspond with apertures in the support structure on which the second mounting structure 214 is mounted. Thus, one or more fasteners may pass through the one or more apertures 608 in the second mounting structure 214 and apertures in the support structure and may attach the second mounting structure 214 to the support structure. Additionally, and/or alternatively, the second mounting structure 214 may be welded to the support structure.

Figure 7:
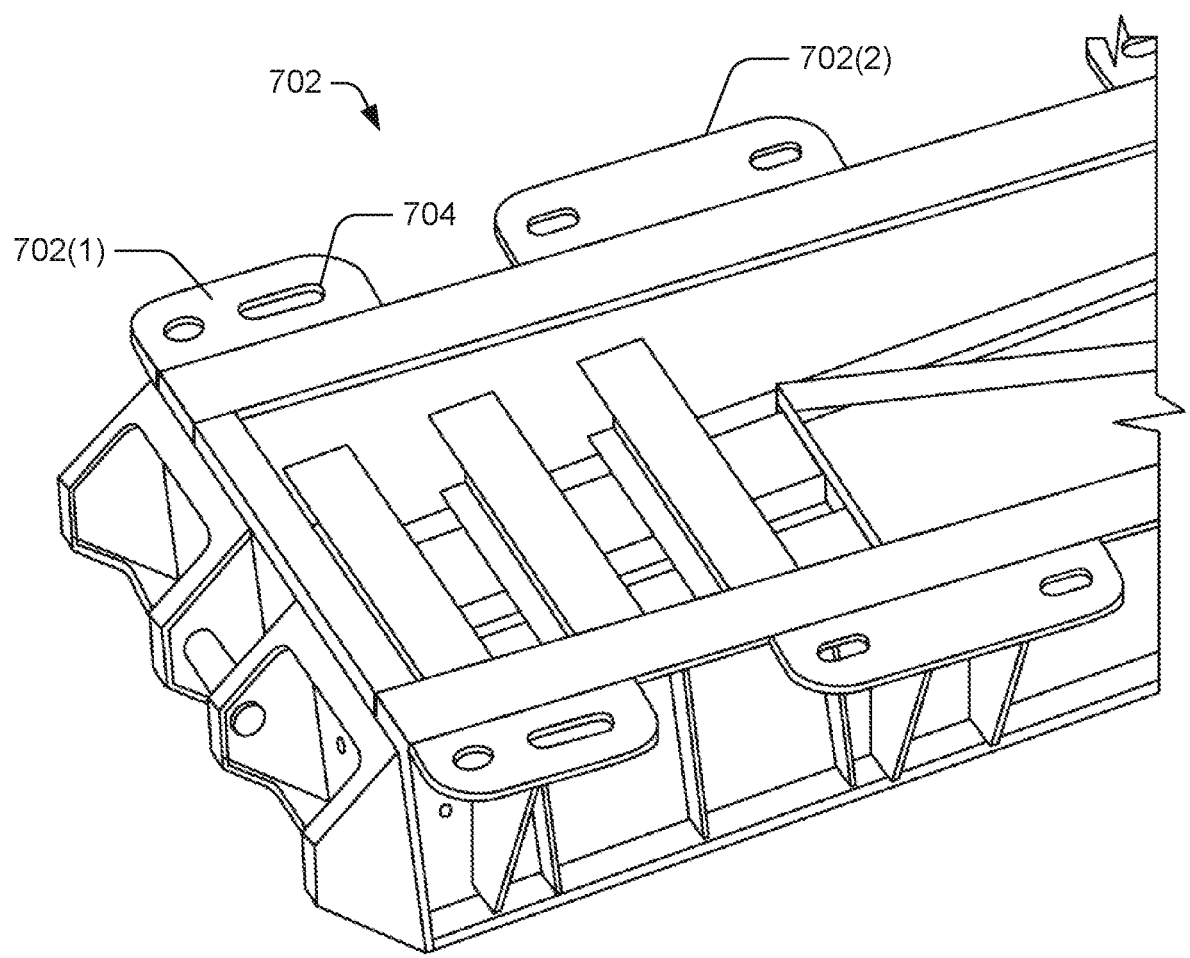
FIG. 7 illustrates a portion of an example trailer chassis in accordance with an example of the present disclosure.

FIG. 7 depicts a portion of the trailer chassis 202. Specifically, FIG. 7 depicts example wing plates 702 disposed proximate the second end 208 of the trailer chassis 202. In some examples, the first mounting structure 212 and the second mounting structure 214 may be coupled to the wing plates 702 via one or more fasteners. Additionally, and/or alternatively, the first mounting structure 212 may be supported by and coupled to a first wing plate 702(1) or a second wing plate 702(2), and the second mounting structure 214 may be supported by and coupled to the first wing plate 702(1) or the second wing plate 702(2). In the first configuration 200 described above, the fracturing head 120 may be mounted on a second mounting structure 214 that is coupled to and supported at least in part by the first wing plate 702(1). In the second configuration 300 described above, a junction 116 is mounted on a first mounting structure 212 that is supported by and coupled to the first wing plate 702(1). In some examples, the first mounting structures 212 may be optionally supported by and coupled to wing plates 702 (i.e., the first wing plate 702(1) or the second wing plate 702(2)) in various positions, while the second mounting structure 214 is coupled to the first wing plate 702(1) that is proximate the end 208 of the trailer chassis 202 in the first configuration 200. In some examples, the trailer chassis 202 may include wing plates 702 disposed along a length of the trailer chassis 202 in various positions such that a mounting position of the junctions 116 and/or the fracturing head 120 may be variable along the length of the trailer chassis 202.

Furthermore, the wing plates 702 include apertures 704 such that when the first mounting structure 212 or the second mounting structure 214 are mounted thereon, the one or more apertures 508 of the first mounting structure 212 or the one or more apertures 608 of the second mounting structure 214 align with the apertures 704 of the wing plates 702. Thus, one or more fasteners may pass through the one or more apertures 508 of the first mounting structure 212 or the one or more apertures 608 of the second mounting structure 214 and the apertures 704 of the wing plates 702, thereby coupling the first mounting structure 212 or the second mounting structure 214 to the wing plates 702. In some examples, the apertures 704 are arranged in a pattern that allows the first mounting structure 212 or the second mounting structure 214 to be mounted in variable positions along a length of the trailer chassis 202. For example, the first wing plate 702(1) may include apertures 704 that are sized and arranged in a pattern such that the first mounting structure 212 or the second mounting structure 214 may optionally be mounted to the first wing plate 702(1). Similarly, the second wing plate 702(2) may include apertures 704 that are sized and arranged in a pattern such that the first mounting structure 212 or the second mounting structure 214 may optionally be mounted to the second wing plate 702(2). Additionally, and/or alternatively, the trailer chassis 202 may not include distinct wing plates but may include a single support structure having apertures 704 sized and arranged such that the first mounting structure 212 or the second mounting structure 214 may be mounted thereto.

Figure 8:
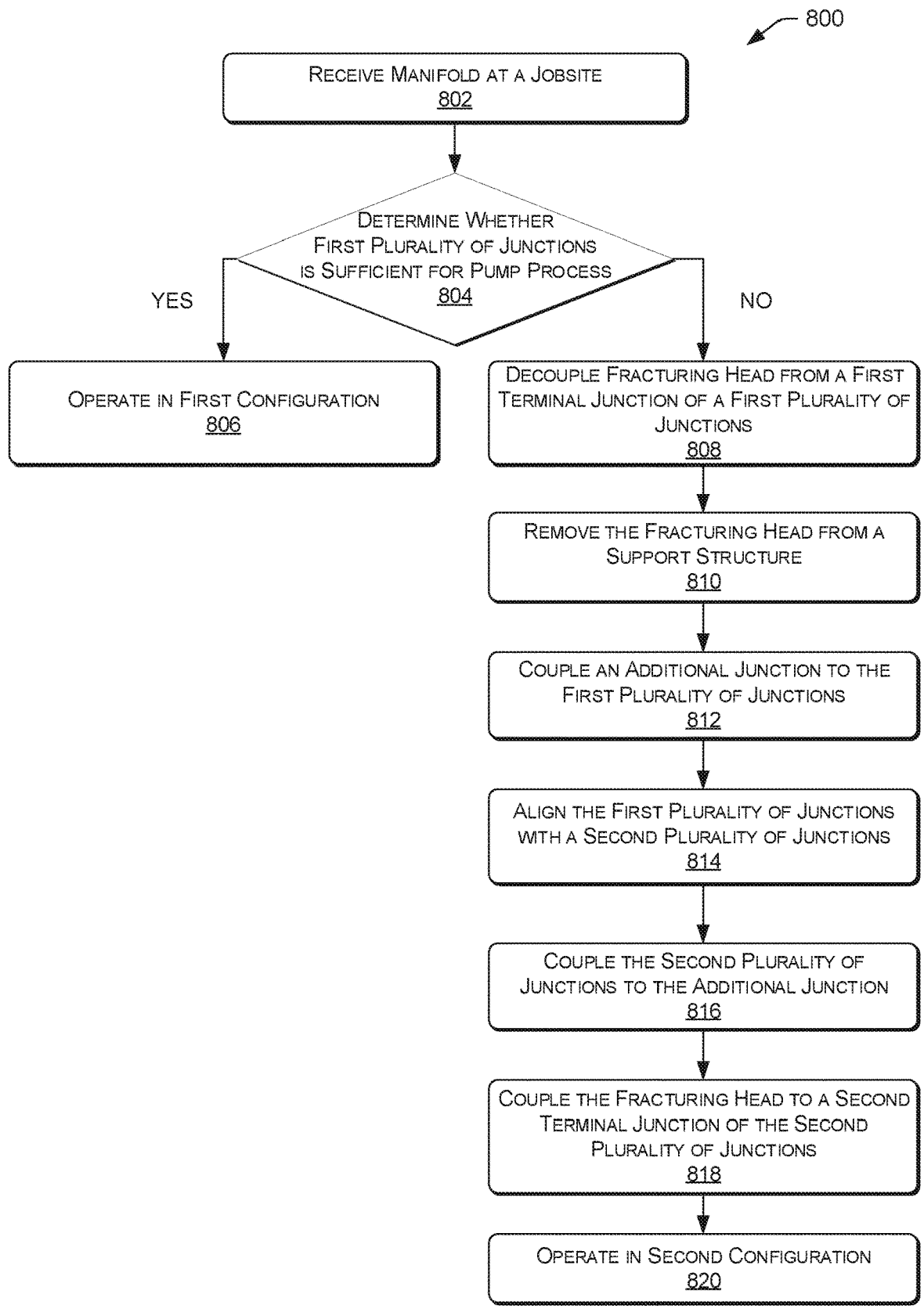
FIG. 8 is a flowchart illustrating a method of configuring a hydraulic fracturing manifold between a first configuration and a second configuration in accordance with an example of the present disclosure.

FIG. 8 illustrates an exemplary process 800 for configuring a manifold, such as the manifold 110, between a first configuration, e.g., the first configuration 200, and a second configuration, e.g., the second configuration 300. While FIG. 8 describes configuring the manifold 110 between the first configuration 200 and the second configuration 300, the process 800 may be carried out in a reverse order. In other words, the process 800 may include configuring the manifold 110 between the second configuration 300 and the first configuration 200. With reference to FIG. 8, at 802, the process 800 begins by receiving the manifold 110 at a jobsite (such as a hydraulic fracturing jobsite). In some examples, the manifold 110 is configured in the first configuration 200 described above during transportation. For example, the manifold 110 may include the first plurality 302 of junctions 116 with the fracturing head 120 being fluidly connected to the first plurality 302 of junctions. As mentioned previously, the first configuration 200 may comport with local transportation requirements such as weight and size restrictions (among other requirements).

Once the manifold 110 is received at the jobsite, at 804, an operator may determine whether the first plurality 302 of junctions 116 is sufficient for a pump process. For example, the operator may determine whether the first plurality 302 of junctions 116 will be sufficient to complete a hydraulic fracturing process. Thus, such a determination may include calculating a fracture pressure and a flow rate that the first plurality 302 of junctions 116 is able to provide. In some examples, an operator may determine whether the first plurality 302 of junctions 116 is sufficient for the pump process prior to the manifold 110 arriving at the jobsite. If the first plurality 302 of junctions 116 is determined to be sufficient for the pump process, the process 800 continues to 806 and the manifold 110 operates in the first configuration 200 during the pump process. However, if the first plurality 302 of junctions 116 is determined to be insufficient for the pump process, the process continues to 808. At 808, the process 800 includes decoupling the fracturing head 120 from a first terminal junction 116(1) of a first plurality 302 of junctions 116. As described above, the first plurality 302 of junctions 116 and the fracturing head 120 may be mounted on the trailer chassis 202 in the first configuration 200. In some examples, decoupling the fracturing head 120 from the first terminal junction 116(1) may include loosening and removing fasteners that attach the fracturing head 120 to conduit 118 that fluidly connects the fracturing head 120 to the first terminal junction 116(1)

At 810, the process 800 continues by removing the fracturing head 120 from a support structure. As mentioned previously, the support structure may include the trailer chassis 202. Removing the fracturing head 120 from the trailer chassis 202 includes removing the fracturing head 120 from a location proximate an end 208 of the trailer chassis 202. Furthermore, removing the fracturing head 120 from the trailer chassis 202 includes removing a second mounting structure 214 from the trailer chassis 202, the second mounting structure 214 configured to support the fracturing head 120 on the trailer chassis 202.

At 812, the process 800 includes coupling an additional junction 116(3) to the first plurality 302 of junctions 116. As such, the additional junction 116(3) is coupled to the first plurality 302 of junctions 116 in the location that is proximate the end 208 of the trailer chassis 202. By coupling the additional junction 116(3) to the first plurality 302 of junctions 116, the additional junction 116(3) and the first plurality 302 of junctions 116 are fluidly connected such that fracturing fluid may flow therebetween. In some examples, coupling the additional junction 116(3) to the first plurality 302 of junctions 116 includes attaching a first mounting structure 212 at the location, the first mounting structure 212 supporting the additional junction 116(3) on the trailer chassis 202.

At 814, the process continues by aligning the first plurality 302 of junctions 116 with a second plurality 304 of junctions 116. In some examples, the second plurality 304 of junctions 116 are mounted on a support substrate that is separate from the trailer chassis 202. For example, the second plurality 304 of junctions 116 may be mounted on a transportation skid 306, or other type of transportable support substrate. In some examples, aligning the first plurality 302 of junctions 116 with the second plurality 304 of junctions 116 includes aligning the first plurality 302 of junctions 116 with the second plurality 304 of junctions in a horizontal and a vertical direction. Furthermore, aligning the first plurality 302 of 116 with the second plurality 304 of 116 may include leveling the first plurality 302 of junctions 116 with the second plurality 304 of junctions 116. Leveling the first plurality 302 of junctions 116 with the second plurality 304 of junctions includes adjusting at least one of the leveling jacks 210 on the trailer chassis or the leveling jacks 402 on the transportation skid 306.

At 816, the process 800 includes coupling the second plurality 304 of junctions 116 to the additional junction 116(3). In some examples, the second plurality 304 of junctions 116 are coupled to the additional junction 116(3) via conduit 118 such that the first plurality 302 of junctions 116, the additional junction 116(3), and the second plurality 302 of junctions 116 are fluidly connected.

At 818, the process 800 includes coupling the fracturing head 120 to a second terminal junction 116(2) of the second plurality 304 of junctions 116. Coupling the fracturing head 120 to a second terminal junction 116(2) of the second plurality 304 of junctions 116 includes mounting the fracturing head 120 on the transportation skid 306 in a location proximate an end 308 of the transportation skid 306. The fracturing head 120 is coupled to the second terminal junction 116(2) such that the fracturing head 120, the second plurality 304 of junctions, the additional junction 116(3), and the first plurality 302 of junctions are fluidly connected. The process 800 ends at 820 where the manifold 110 operates in the second configuration. Thus, fracturing fluid is able to flow through the manifold 110 in the second configuration 300.

INDUSTRIAL APPLICABILITY

The present disclosure describes a hydraulic fracturing manifold 110 in a hydraulic fracturing system 100 (or other fluid pump system) that is modular between various configurations. The manifold 110 described herein eliminates the use of multiple fracturing heads 120 in a modular manifold system and implements a single fracturing head 120, thereby reducing overall cost and weight of the manifold 110. The manifold 110 is configurable between at least two configurations. In a first configuration 200, the manifold 110 is mounted on a trailer chassis 202 and is fluidly connected to a first plurality 302 of junctions 116. In a second configuration 300, the fracturing head 120 is removed from the trailer chassis 202 and an additional junction 116(3) is coupled to the trailer chassis 202 and is fluidly connected to the first plurality 302 of junctions 116. In the second configuration 300, a second plurality 304 of junctions 116 (which may be mounted on a transportation skid 306) are fluidly connected to the first plurality 302 of junctions 116. The fracturing head 120 is then coupled to the second plurality 304 of junctions 116.

Because of this modularity, the manifold 110 described herein provides a number of benefits. For instance, this modularity increases a greater range of flow rates that the manifold 110 provides during hydraulic fracturing (or other pump processes). Furthermore, by eliminating the use of multiple fracturing heads 120, the manifold 110 decreases the overall weight and cost of the manifold.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A modular fracturing manifold, comprising:
   a trailer chassis;
   a first plurality of junctions mounted on the trailer chassis and fluidly connected via conduit, individual junctions of the first plurality of junctions configured to receive fracturing fluid from a fracturing pump via a high-pressure flow line and the first plurality of junctions terminating at a first terminal junction; and
   a fracturing head fluidly connected to the first plurality of junctions, wherein the modular fracturing manifold is configurable between:
      a first configuration in which the fracturing head is mounted on the trailer chassis, at a location proximate an end of the trailer chassis, and the fracturing head is coupled to the first terminal junction; and
      a second configuration in which an additional junction is mounted on the trailer chassis at the location, the additional junction is coupled to the first terminal junction, a second plurality of junctions is fluidly connected to the additional junction, and the fracturing head is coupled to a second terminal junction of the second plurality of junctions.

2. The modular fracturing manifold of claim 1, further comprising:
   a first mounting structure configured to support an individual junction of the first plurality of junctions on the trailer chassis, wherein the first mounting structure is attached to and supported by a first wing plate or a second wing plate located on the trailer chassis; and
   a second mounting structure configured to support the fracturing head, wherein the second mounting structure is attached to and supported by the first wing plate or second wing plate located on the trailer chassis.

3. The modular fracturing manifold of claim 2, wherein the first mounting structure is a T-shaped plate including a top portion configured to support the individual junction and a bottom portion coupled to a support structure.

4. The modular fracturing manifold of claim 2, wherein the second mounting structure is a U-shaped plate including an upper portion configured to support the fracturing head and a bottom portion coupled to a support structure.

5. The modular fracturing manifold of claim 2, wherein the first wing plate or the second wing plate includes apertures sized and arranged in a pattern such that the first mounting structure or the second mounting structure are optionally coupled thereto.

6. The modular fracturing manifold of claim 1, wherein the second plurality of junctions is mounted on a transport skid and the fracturing head is mounted on the transportation skid in the second configuration.

7. The modular fracturing manifold of claim 1, wherein the modular fracturing manifold excludes additional fracturing heads in the second configuration.

8. A method for configuring a modular fracturing manifold between a first configuration and a second configuration, the method comprising:
   decoupling a fracturing head from a first terminal junction of a first plurality of junctions, the fracturing head and the first plurality of junctions being mounted on a trailer chassis;
   removing, from the trailer chassis, the fracturing head from a location that is proximate an end of the trailer chassis;
   coupling an additional junction to the first terminal junction at the location such that the additional junction is fluidly connected to the first plurality of junctions;
   aligning the first plurality of junctions with a second plurality of junctions disposed on a transportation skid;

coupling the second plurality of junctions to the additional junction such that the first plurality of junctions, the additional junction, and the second plurality of junctions are fluidly connected; and coupling the fracturing head to a second terminal junction of the second plurality of junctions on the transportation skid such that the fracturing head is fluidly connected to the second plurality of junctions.

9. The method of claim 8, wherein aligning the first plurality of junctions with the second plurality of junctions includes aligning the first plurality of junctions with the second plurality of junctions in a horizontal direction and a vertical direction.

10. The method of claim 8, wherein the transportation skid includes one or more leveling arms configured to adjust a vertical height of the transportation skid.

11. The method of claim 8, wherein the fracturing head is fluidly connected to either the first terminal junction or the second terminal junction via conduit.

12. The method of claim 8, wherein removing the fracturing head from the trailer chassis includes removing a U-shaped plate from the trailer chassis, the U-shaped plate configured to support the fracturing head on the trailer chassis.

13. The method of claim 12, wherein coupling the fracturing head to the second terminal junction includes attaching the U-shaped plate to the transportation skid such that the U-shaped plate supports the fracturing head on the transportation skid.

14. The method of claim 8, wherein coupling the additional junction to the first plurality of junctions includes attaching a T-shaped plate at the location, the T-shaped plate configured to support the additional junction on the trailer chassis.

15. A fracturing manifold system, comprising:
a first plurality of junctions mounted on a support structure and fluidly connected via conduit, individual ones of the first plurality of junctions configured to receive fracturing fluid from at least one fracturing pump and the first plurality of junctions including a first terminal junction; and a fracturing head fluidly connected to the first plurality of junctions, wherein the fracturing manifold system is configurable between at least:
a first configuration in which the fracturing head is mounted on the support structure, at a location proximate an end of the support structure, and the conduit provides direct fluid communication between the fracturing head and the first terminal junction; and a second configuration in which an additional junction is mounted on the support structure at the location, the additional junction is fluidly connected to the first terminal junction, a second plurality of junctions is fluidly connected to the additional junction, and the fracturing head is fluidly connected to one of the second plurality of junctions.

16. The fracturing manifold system of claim 15, wherein individual junctions of the first plurality of junctions and the second plurality of junctions are mounted on a first mounting structure configured to support the individual junctions.

17. The fracturing manifold system of claim 16, further comprising a second mounting structure configured to support the fracturing head.

18. The fracturing manifold system of claim 15, wherein the support structure is a first support structure and the second plurality of junctions are mounted on a second support structure that is distinct from the first support structure.

19. The fracturing manifold system of claim 18, wherein the first support structure includes a trailer chassis and the second support structure includes a transport skid.

20. The fracturing manifold system of claim 15, wherein the fracturing manifold system excludes additional fracturing heads in the second configuration.

* * * * *